Figure 1:
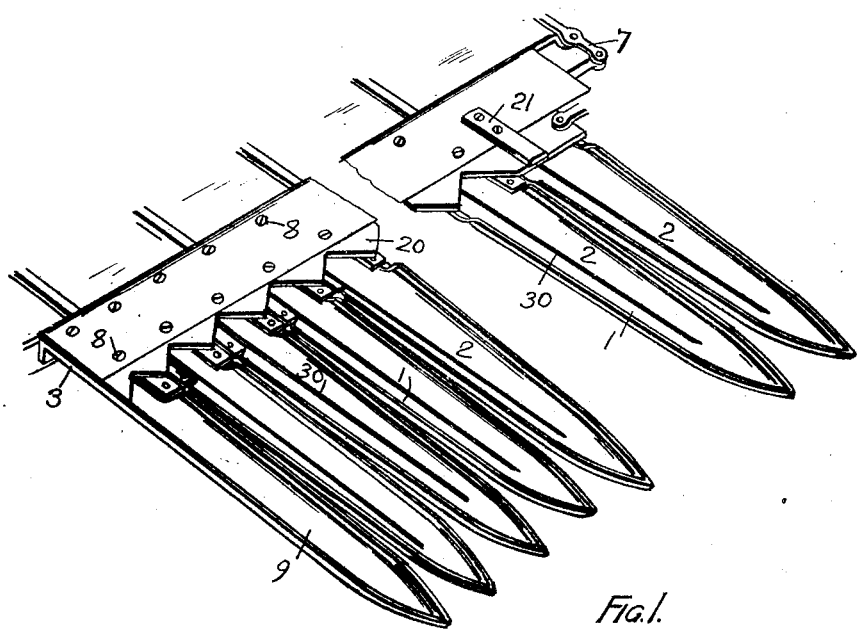

C. AND W. H. BAUERT.
COMB OF HARVESTERS.
APPLICATION FILED AUG. 19, 1920.

1,368,014.

Patented Feb. 8, 1921.
3 SHEETS—SHEET 1.

INVENTORS
Carl Bauert
William Henry Bauert

By
ATTORNEY

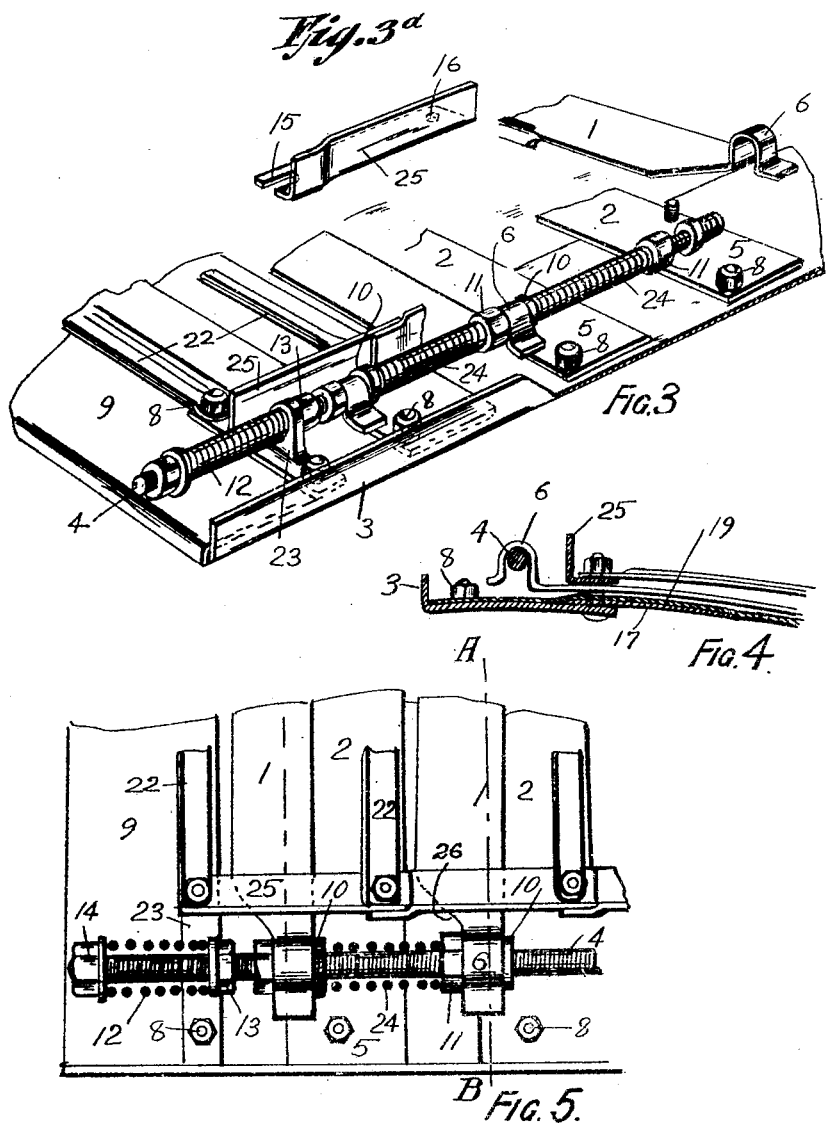

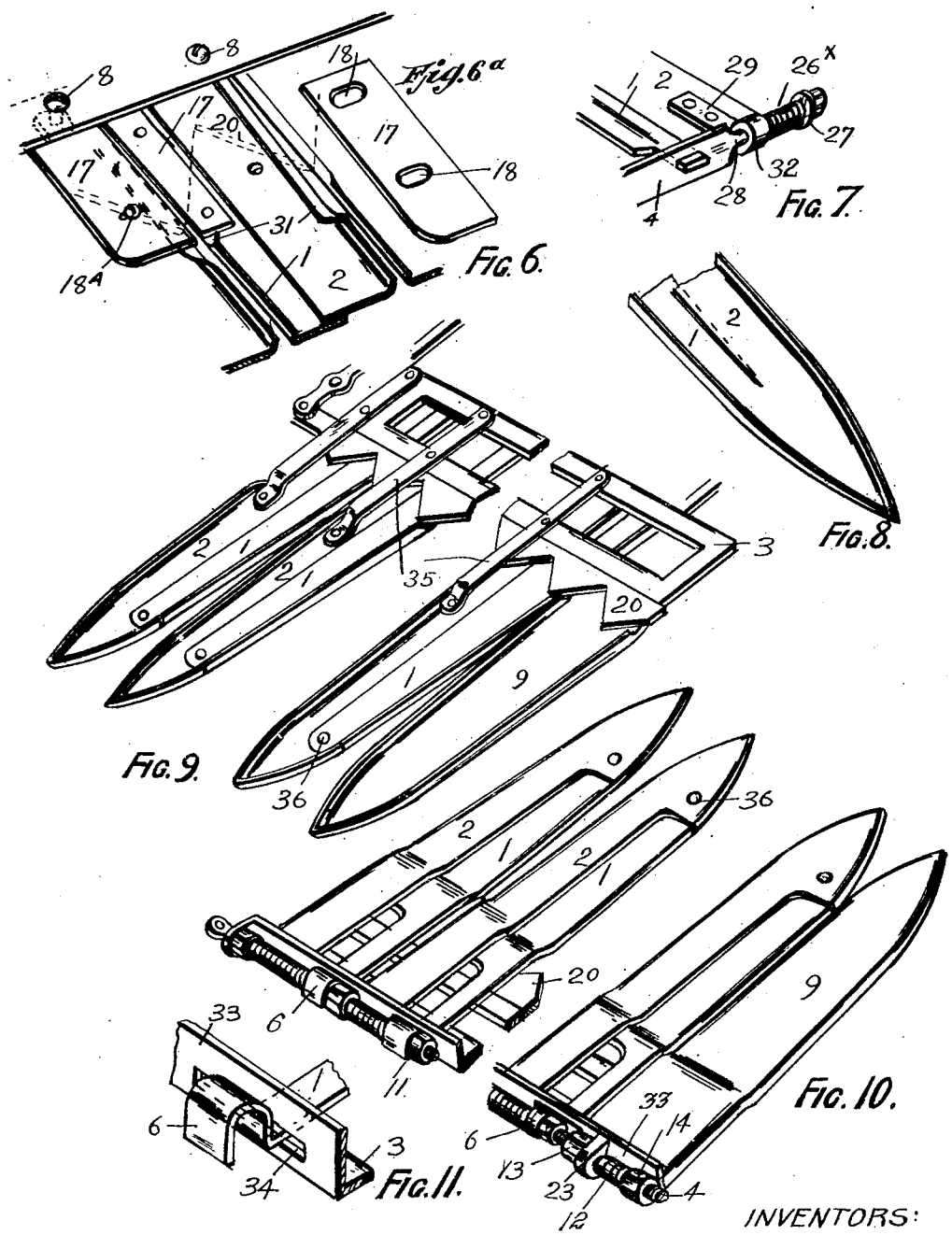

UNITED STATES PATENT OFFICE.

CARL BAUERT, OF FORBES, NEW SOUTH WALES, AND WILLIAM HENRY BAUERT, OF SHIRLEY ROAD, ROSEVILLE, NEW SOUTH WALES, AUSTRALIA.

COMB OF HARVESTERS.

1,368,014.  Specification of Letters Patent.  Patented Feb. 8, 1921.

Application filed August 19, 1920. Serial No. 404,707.

*To all whom it may concern:*

Be it known that CARL BAUERT and WILLIAM HENRY BAUERT, subjects of the King of Great Britain and Ireland, and residing, respectively, at Forbes, New South Wales, Australia, and Shirley Road, Roseville, New South Wales, Australia, aforesaid, have invented certain new and useful Improvements in Combs of Harvesters, of which the following is a specification.

This invention relates to the combs of strippers, stripper harvesters and like machines of that type in which the teeth of the comb are adapted to have the openings between them varied to suit different conditions of crop.

The invention has been designed with the object of providing means under the control of the driver by which he may alter the widths or spaces between the whole of the teeth of the comb. A further object is to provide means associated with each individual tooth of the comb which will permit of the space between adjacent teeth being widened automatically to prevent choking of the teeth of the comb when the crops which are being operated on contain thistles, wild lettuce, and the like. A still further object is to provide means by which the teeth may be adjusted to permit the spaces between adjacent teeth of the comb to be regulated when the edges of the teeth become worn.

Combs in accordance with the invention are constructed with teeth which have a fixed portion detachably secured to the comb bar and a movable portion which is also detachably connected at its rear end with a reciprocable rod. One of the edges of the movable portions of the teeth overlap one of the edges of the fixed portion, and the movable portions of the teeth are capable of being moved laterally by means of the reciprocable rod to which their rear ends are secured to vary the width of space between adjacent teeth of the comb. At the rear of the teeth adjustable ledger plates may be fitted to prevent wear of the teeth by the friction of a sickle knife on them, in cases where the comb is attached to harvesting machines in which the crop is cut by a reciprocating knife. The teeth may be depressed or bent to receive the ledger plates. To prevent fouling of the reciprocable rod by the crop, slotted check plates may be provided at the rear of the teeth, and overlying them. These plates may be dispensed with and the extreme rear end of the comb bar may be constructed to allow the rear ends of the movable portions of the teeth to pass through it, such end of the comb bar being also adapted to carry the reciprocable rod and to prevent fouling of the rod by the crop. The teeth may be reinforced with strengthening ribs which are fastened at one end to the comb bar and at the other end to the fixed portions of the teeth. Guide plates secured at one end to the comb bar may be provided for the sickle knife in those harvesting machines in which such knives are used, but the strengthening ribs if arranged on the upper faces of the teeth may be formed to also act as guides for the sickle knife.

Figure 2:
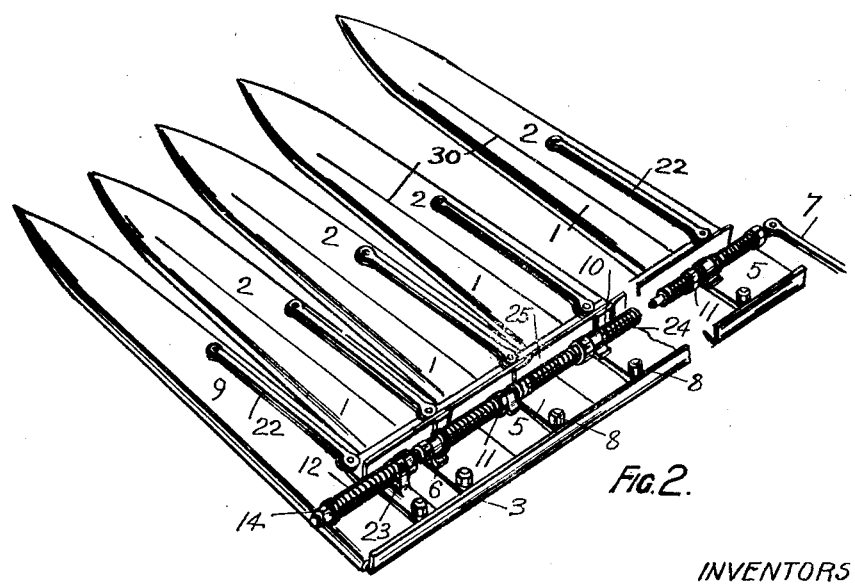

Referring to the accompanying drawings, Figure 1 is a perspective view showing the upper side of a comb with split teeth, which has ledger plates and a sickle knife thereon; Fig. 2 is a perspective view of the underside of the comb shown in Fig. 1; Fig. 3 is a perspective view on an enlarged scale corresponding with Fig. 2, but showing one of the movable portions of the teeth disconnected from the reciprocable rod; Fig. 3$^a$ is a perspective view of one of the check plates removed from the comb; Fig. 4 is a transverse section on the line A—B Fig. 5; Fig. 5 is an underside plan view of the comb; Fig. 6 is a perspective view illustrating the ledger plates, their attachment to the comb and the overlapping of the fixed and movable portions of the teeth of the comb; Fig. 6$^a$ illustrates one of the ledger plates; Fig. 7 is a view illustrating a modified form of reciprocable rod and mode of attaching the rear ends of the teeth to it; Fig. 8 is a view of the outer end of one of the teeth showing its fixed and movable portions overlapping one another; Fig. 9 is a broken perspective view showing the upper side of the comb with strengthening ribs attached to the fixed portions of the teeth and to the comb bar; Fig. 10 is a broken perspective view showing the underside of the comb illustrated in Fig. 9 with the reciprocable rod attached to the extreme rear of the comb bar; and Fig. 11 is a detail view corresponding with Fig. 10 illustrating the construction of the rear plate of the comb bar to permit the movable ends of the teeth to pass therethrough.

With reference to Figs. 1 to 6 and Figs. 9 to 11 of the drawings:—

The teeth of the comb are preferably constructed of springy steel and may be slit from a point near their tapering front portion and the slit extended to the rear of the teeth, so that one edge of the split portion of the teeth may be made to overlap the other edge of the split portion of the teeth. The teeth may, however, be made in separate portions instead of being slit, in which case one portion may be attached by a pin 36 or like means to the other portion at the front thereof, or the movable portion may be welded to the fixed portion of the tooth about the pointed front end thereof, and the two portions made to overlap so that one portion will be slidable laterally over the other portion. The slits 30 are cut in the teeth so that the movable portion 1 of the teeth will be narrower than the fixed portion 2 thereof.

Supported on the comb bar 3 is the reciprocable rod 4 which is screw threaded and may overlie the rear ends 5 of the stationary portion of the teeth (Figs. 1-5), or may be supported at the extreme rear end of the comb bar (Fig. 10). The ends 5 of the teeth are secured by nuts and bolts 8 or other suitable fastenings to the comb bar 3, while the rear ends 6 of the movable portion of the teeth are secured to the rod 4 by bending the ends over the rod. The rod 4 extends across the comb bar 3 and one end of it is connected at 7 with means which are fastened to a control lever within reach of the driver, by which he may operate the rod when it is desired to either widen or narrow the spaces between the teeth of the comb. A quadrant or other suitable device may be affixed to the harvester for the purpose of maintaining the control lever in any required position, depending on the movements imparted by the driver to the rod 4, for the purpose of setting the teeth of the comb to the required width. One end of the rod 4 is carried in the bracket 23 which is secured to the comb bar 3, and the other end of the rod may be mounted in a similar bracket supported on the comb plate; or the comb bar may have one of its lateral ends upset, which end is holed, and the end of the rod is threaded through it and fastened to the means connected with the control lever on the harvester. The tooth 9 of the comb is not slitted; it is made in one piece, and is fastened at its rear end to the comb bar 3, and is not fitted with a movable portion. All the other teeth of the comb are, however, slitted or provided with a movable portion and a fixed portion as previously described.

If the reciprocable rod 4 is mounted on the extreme rear end of the comb bar 3 as shown in Fig. 10 such end 33 is provided with holes 34 through which the rear ends 6 of the movable portions of the teeth may be threaded to permit them to be secured to the rod 4 as shown in such figure and also in Figs. 1-5.

On the rod 4 are the springs 24, one end of which bears against the washers 10 which abut one side of the bent ends 6 of one of the movable portions of the teeth of the comb, while their other end abuts the nuts 11 which take against one side of the bent ends 6 of adjacent teeth. The width of space between each of the separate teeth may be adjusted by turning the nuts 11 to move the bent ends 6 of the movable portions 1 of the teeth across the rod 4 when the edges of the teeth become worn. If the springs 24 are dispensed with a pair of nuts 11 may be provided on the rod 4 for each bent end 6 of the movable portions of the teeth which are attached to the rod, so that such ends may be held in position on the rod and be capable of adjustment thereon in positioning the movable portions of the teeth in relation to their fixed portions. In order to allow for the adjustment of the whole of the teeth simultaneously the rod 4 is fitted with the spring 12 and the nut 13. The spring 12 abuts at one end against the nut 14 and at the other end against the bracket 23. The backward movement of the rod 4 across the comb bar 3 is limited, depending on the position of the nut 13 on the rod 4 in relation to the bracket 23, and the position of such nut on the rod in relation to the bracket limits also the movement of the portion 1 of the teeth of the comb, as the rear ends 6 of the teeth overlie and partly embrace the rod 4. The ends 6 of the movable portions 1 of the teeth are held on the rod 4 between the washers 10 and the nuts 11, the inner ends of the movable portions 1 of the teeth being cut away as at 26 and the metal bent upwardly and returned to form the ends 6.

Each of the teeth of the comb is removable separately from the comb bar 3; they are fastened thereto by the nuts and bolts 8. The front row of nuts and bolts 8 may also serve to secure to the comb bar 3 the separate check plates 25 when these are used and are positioned toward the rear ends of the teeth. The construction of the check plates will be seen on reference to Fig. 3 of the drawings. A separate check plate is provided for each separate tooth of the comb, and when the whole of the plates are mounted on the comb bar 3 they form a continuous wall between the front edge of the comb bar and the rod 4 when the latter is positioned on the comb bar as shown in Figs. 1 to 5. The check plates 25 comprise separate L-shaped plates, which are slotted at one end 15, and holed at 16 at the other end, to enable the plates to be readily detached from the teeth and the comb bar 3. In securing the check plates to the teeth and the comb bar 3, the ends 15 of the check plates are fitted to one of the bolts 8, and the other ends 16 thereof are threaded on one of the adjacent bolts 8. When the plates are mounted end to end on the comb bar, they serve as a check to the crop becoming entangled with the reciprocable rod 4 and its fittings and so preventing easy movement thereof. In Fig. 10 the reciprocable rod 4 is shown supported at the rear end 33 of the comb bar 3 and such end acts as a check to the crop preventing movement of the rod.

In those harvesting machines which are fitted with a reciprocating knife for heading the crop, the teeth of the comb may have mounted on them ledger plates 17, which consist of flat plates having elongated openings 18 to receive the bolts 8 and the screws 18ª or like fastenings. In Fig. 6 the ledger plates overlying the stationary portions 2 of the teeth are shown fastened at one end by the bolts 8 to the comb bar 3 and at the other end to the teeth. It will be understood, however, that the ledger plates overlying the stationary portions 2 of the teeth may be secured at both ends to the teeth and not as shown in Fig. 6. The ledger plates which overlie the movable portions 1 of the teeth are not secured to the comb bar but to such movable portions. The teeth of the comb are preferably of channel section and are formed with a depression 19 (Fig. 4) to enable the ledger plates 17 to lie therein, so that the knife 20 (Fig. 1), when it is being reciprocated to cut the crop, will ride on the ledger plates and will not wear the upper side of the teeth over which it lies. The inner edges of the teeth are overfolded at 31 and the edges of the ledger plates 17 overlie the edges 31 of the teeth. Guides 21 (Fig. 1) for the knife 20 may be provided on the comb bar 3, if required. To reinforce the teeth of the comb they may be furnished on their undersides with ribs 22, which may consist of plates bent to L-shape and fastened by bolts or by other suitable means at one end to the stationary portions of the teeth and at the other end to the comb bar 3. In case the ledger plates 17 become worn at their edges overlying the inner edges of the teeth of the comb through the crop coming in contact with them, they may be adjusted on the teeth by loosening the bolts 8 and screws 18ª and shifting the plates toward or away from each other, through the elongated openings 18 therein, on the teeth, so that the edges of the plates and the edges of the teeth underlying them may be made to coincide. In place of the guide plates 21 and the ribs 22 the guide and strengthening ribs 35 (Fig. 9) may be provided; the latter ribs may be used when our comb is attached to harvesters fitted with a sickle knife for heading the crop. Said ribs 35 are attached at one end by bolts or other suitable means to the comb bar 3 and at the other end to the stationary portion 2 of the teeth; they are formed in such manner to act as a guide for the sickle knife and also as a stay for the teeth.

In Fig. 7 an alternative construction of reciprocable rod is shown, the rod being provided with a series of holes through which the ends of the movable portions 1 of the teeth are threaded. The rod may be of rectangular or any other convenient section and its end 28 is reduced and carries a spring $26^x$ which has its ends abutting respectively against the nut 27 and the collar 32 on the bracket 29. To vary the width between the teeth it is only necessary for the driver to pull on the rod 4 to compress the spring $26^x$, and the teeth may thus be held with spaces between them, which spaces will be regulated in accordance with the degree of movement applied to the rod 4 by the driver. As shown in Fig. 7, the rod 4 is not provided with means for altering separately the width of the spaces between adjacent teeth of the comb, but the rod may be constructed of angle iron and fitted with means associated with each of the movable portions of the teeth as previously described by which those portions may be permitted movement separately to enable adjustment of the width of space between adjacent teeth.

What we claim as our invention and desire to secure by Letters Patent is:—

1. A comb for harvesters of the type herein described comprising a series of teeth each of which has a stationary portion and a movable portion overlapping one edge of said stationary portion, said stationary portions having their rear ends secured to a comb bar and said movable portions having their rear ends engaging a screw-threaded reciprocable rod carried on said comb bar and provided with adjustable means for regulating the width of space between adjacent teeth either individually or as a whole by lateral movement imparted to the movable portions of said teeth.

2. In a comb for harvesters of the type herein described a comb bar, a screw threaded rod mounted on the rear of the comb bar, having connected to it at one end an adjustable abutment for one end of a coil spring supported on said rod, means secured to the other end of the rod for reciprocating the same, a nut on said rod adapted to be traversed thereon and to abut a bearing for said rod carried on the rear of said comb bar to limit backward movement of said rod, and a series of teeth each of which has a stationary portion secured at its rear end to said comb bar, and a movable portion overlapping one edge of said fixed portion and detachably affixed at its rear end to said rod.

3. In a comb for harvesters of the type herein described, a comb bar, a screw threaded rod carried in bearings on the comb bar, a series of teeth each of which is provided with a stationary portion secured at its rear to said comb bar and a movable portion having its rear end engaging said rod, a series of coil springs supported on said rod one for each of said movable teeth portions, abutments for the ends of said springs on said rod between which the rear ends of said movable teeth portions are positioned on said rod, one of said abutments consisting of a nut, means attached to one end of said rod to reciprocate the same and an adjustable nut on said end, a coil spring on the other end of said rod abutting respectively at its ends an adjustable nut on said rod and one of said bearings, and a nut traversable on said rod and capable of abutting one of said bearings to limit backward movement of said rod.

4. In combination with a comb for a harvester comprising a comb bar, teeth each having a fixed and a movable portion, and a reciprocable rod carried by the bar, of a plurality of L-shaped check plates adapted to be secured to the comb bar end to end forwardly of the reciprocable rod, to prevent fouling of said rod by the crop when the latter is being cut.

5. In combination with a comb for a harvester comprising a comb bar, teeth each having a fixed and a movable portion, and a reciprocable rod carried by the bar, of a sickle knife adapted to be reciprocated across the teeth of said comb, and a plurality of strengthening ribs having their ends respectively secured to the comb bar and the stationary portions of the teeth.

6. In combination with a comb for a harvester comprising a comb bar, teeth each having a fixed and a movable portion, a reciprocable rod carried by the bar, and ledger plates overlying said teeth, of a sickle knife adapted to be reciprocated across the teeth of said comb over said ledger plates, there being one ledger plate for each of the stationary and movable portions respectively of the teeth of said comb, said ledger plates for said stationary portions having elongated openings therein to permit adjustment of them on the upper faces of said teeth, and a plurality of strengthening ribs (one for each tooth of the comb) secured at one end of the under faces of said stationary portions and at the other end to the comb bar.

7. In a comb for a harvester comprising a comb bar, a reciprocable rod carried thereby, a plurality of teeth each having a fixed portion and a movable portion, and an additional tooth at one side of the comb without a movable portion, said tooth being attached at its rear end to the comb bar.

8. In a comb for a harvester a comb bar, a reciprocable rod carried thereby, and a plurality of teeth each comprising a fixed and a movable portion, the rear ends of the movable portions of the teeth of the comb being offset to enable said ends to be readily attached to and detached from the reciprocable rod.

9. In a comb for a harvester of the type herein described, a series of teeth each of which has a stationary portion attached at its rear end to a comb bar and a movable portion overlapping one edge of said stationary portion and detachably secured at its rear end to a screwthreaded rod, means on said rod for causing reciprocation thereof, adjustable nuts on said rod at opposite sides of the rear ends of the movable portions of said teeth for positioning said movable portions in relation to said stationary portions, and means associated with said rod for regulating the width of spaces between the teeth of the comb.

In testimony whereof we have affixed our signatures.

CARL BAUERT.
WILLIAM HENRY BAUERT.